(12) United States Patent
Fuchs et al.

(10) Patent No.: US 9,361,727 B2
(45) Date of Patent: Jun. 7, 2016

(54) METHODS, SYSTEMS, AND COMPUTER READABLE MEDIA FOR GENERATING AUTOSTEREO THREE-DIMENSIONAL VIEWS OF A SCENE FOR A PLURALITY OF VIEWPOINTS USING A PSEUDO-RANDOM HOLE BARRIER

(75) Inventors: Henry Fuchs, Chapel Hill, NC (US); Leonard McMillan, Chapel Hill, NC (US); Andrew Nashel, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 981 days.

(21) Appl. No.: 13/254,836

(22) PCT Filed: Mar. 8, 2010

(86) PCT No.: PCT/US2010/026537
§ 371 (c)(1),
(2), (4) Date: Nov. 21, 2011

(87) PCT Pub. No.: WO2010/102290
PCT Pub. Date: Sep. 10, 2010

(65) Prior Publication Data
US 2012/0062565 A1    Mar. 15, 2012

Related U.S. Application Data

(60) Provisional application No. 61/158,247, filed on Mar. 6, 2009.

(51) Int. Cl.
*G06T 15/00* (2011.01)
*G06T 15/20* (2011.01)
(Continued)

(52) U.S. Cl.
CPC ............ *G06T 15/20* (2013.01); *H04N 13/0409* (2013.01); *H04N 13/0468* (2013.01);
(Continued)

(58) Field of Classification Search
CPC ......... G06T 19/00; G06T 17/20; G06T 17/00; G06T 15/10; G06T 15/00
USPC ............. 345/419, 421, 420, 427, 6, 158, 163, 345/424, 422, 426, 600; 382/154, 162, 303, 382/205, 278; 348/51, 42, 54, 55, 53, 169
See application file for complete search history.

(56) References Cited

U.S. PATENT DOCUMENTS 4,747,411 A * 5/1988 Ledley ................ G01S 15/8952
128/916
5,330,799 A * 7/1994 Sandor et al. ................. 427/510
(Continued)

OTHER PUBLICATIONS

Notification of Transmittal of the International Search Report and the Written Opinion of the International Searching Authority, or the Declaration for International Application No. PCT/US2010/026537 (Oct. 19, 2010).

(Continued)

*Primary Examiner* — Abderrahim Merouan
(74) *Attorney, Agent, or Firm* — Jenkins, Wilson, Taylor & Hunt, P.A.

(57) ABSTRACT

Methods, systems, and computer readable media for generating autostereo three-dimensional views of a scene for a plurality of viewpoints are disclosed. According to one system, a display is configured to display images from plural different viewpoints using a barrier located in front of the display, where the barrier has a pseudo-random arrangement of light ports through which images on the display are viewable. A renderer coupled to the display simultaneously renders images from the different viewpoints such that pixels that should appear differently from the different viewpoints are displayed in a predetermined manner. The pseudo-random arrangement of the light ports in the barrier smoothes interference between the different viewpoints as perceived by viewers located at the different viewpoints.

38 Claims, 8 Drawing Sheets

(51) Int. Cl.
*H04N 13/04* (2006.01)
*G06T 17/20* (2006.01)
*G06T 17/00* (2006.01)
*G06T 19/00* (2011.01)
*G06T 15/10* (2011.01)

(52) U.S. Cl.
CPC ............... *G06T15/00* (2013.01); *G06T 15/10* (2013.01); *G06T 17/00* (2013.01); *G06T 17/20* (2013.01); *G06T 19/00* (2013.01)

(56) References Cited

U.S. PATENT DOCUMENTS

| | | | | |
|---|---|---|---|---|
| 5,371,627 | A * | 12/1994 | Baccei | G02B 27/22 359/462 |
| 5,543,965 | A | 8/1996 | Bielinski et al. | |
| 5,808,784 | A * | 9/1998 | Ando | G02B 3/0031 359/400 |
| 6,023,263 | A * | 2/2000 | Wood | 345/581 |
| 6,302,541 | B1 * | 10/2001 | Grossmann | 351/240 |
| 6,307,585 | B1 * | 10/2001 | Hentschke | 348/51 |
| 7,046,272 | B2 * | 5/2006 | Schwerdtner | 348/51 |
| 7,190,518 | B1 * | 3/2007 | Kleinberger et al. | 359/465 |
| 7,825,999 | B2 * | 11/2010 | Chestak et al. | 349/15 |
| 2004/0070588 | A1 * | 4/2004 | Harrington | G02B 27/2221 345/629 |
| 2005/0105179 | A1 * | 5/2005 | Taira et al. | 359/463 |
| 2006/0170764 | A1 * | 8/2006 | Hentschke | 348/42 |
| 2007/0165305 | A1 * | 7/2007 | Mehrle | 359/464 |
| 2008/0088753 | A1 * | 4/2008 | Chestak et al. | 349/15 |
| 2008/0259233 | A1 * | 10/2008 | Krijn et al. | 349/15 |
| 2009/0046301 | A1 * | 2/2009 | Asakura et al. | 356/610 |
| 2009/0080099 | A1 * | 3/2009 | Tanimoto et al. | 359/893 |
| 2009/0251685 | A1 * | 10/2009 | Bell | G01B 11/002 356/51 |
| 2011/0169919 | A1 * | 7/2011 | Karaoguz et al. | 348/46 |
| 2011/0249331 | A1 * | 10/2011 | Klippstein et al. | 359/464 |
| 2012/0299802 | A1 * | 11/2012 | Yamazaki et al. | 345/32 |
| 2015/0036211 | A1 * | 2/2015 | Chen et al. | 359/462 |

OTHER PUBLICATIONS

"3D TV," http://www.merl.com/projects/3dtv/, pp. 1-2 (Jan. 16, 2009).

Peterka et al., "Advances in the Dynallax Solid-State Dynamic Parallax Barrier Autostereoscopic Visualization Display System," IEEE Transactions on Visualization and Computer Graphics, vol. 14, No. 3, pp. 487-499 (May/Jun. 2008).

"Stunning 3d viewing: Spectacle without spectacles," 42-3D6W02, PHILIPS, pp. 1-2 (May 14, 2008).

Zwicker et al., "Antialiasing for Automultiscopic 3D Displays," SIGGRAPH '06: ACM SIGGRAPH 2006 Sketches, p. 107 (2006).

Sandin et al., "The Varrier™ Autostereoscopic Virtual Reality Display," SIGGRAPH '05: ACM SIGGRAPH 2005 Papers, pp. 894-903 (2005).

Matusik et al., "3D TV: A Scalable System for Real-Time Acquisition, Transmission, and Autostereoscopic Display of Dynamic Scenes," SIGGRAPH '04: ACM SIGGRAPH 2004 Papers, pp. 814-824 (2004).

Son et al., "Case Study of Autostereoscopic Image Based on SIRDS Algorithm," Periodica Polytechnica Ser. El. Eng., vol. 45, No. 2, pp. 119-138 (2001).

Perlin et al., "An Autostereoscopic Display," SIGGRAPH '00: Proceedings of the 27th Annual Conference on Computer Graphics and Interactive Techniques, pp. 319-326 (2000).

Cook, "Stochastic Sampling in Computer Graphics," ACM Transactions on Graphics, vol. 5, No. 1, pp. 51-72 (Jan. 1986).

Dippé et al., "Antialiasing Through Stochastic Sampling," SIGGRAPH '85, vol. 19, No. 3, pp. 69-78 (1985).

\* cited by examiner

METHODS, SYSTEMS, AND COMPUTER READABLE MEDIA FOR GENERATING AUTOSTEREO THREE-DIMENSIONAL VIEWS OF A SCENE FOR A PLURALITY OF VIEWPOINTS USING A PSEUDO-RANDOM HOLE BARRIER

PRIORITY CLAIM

This application claims the benefit of U.S. Provisional Patent Application Ser. No. 61/158,247 filed Mar. 6, 2009; the disclosure of which is incorporated herein by reference in its entirety.

TECHNICAL FIELD

The subject matter described herein relates to autostereoscopic displays. More specifically, the subject matter relates to methods, systems, and computer readable media for generating autostereo three-dimensional views of a scene for a plurality of viewpoints using a pseudo-random hole barrier.

BACKGROUND

A stereoscopic display presents different images to the left and right eyes of a viewer to enhance 3D perception. Stereo display may be accomplished, for example, using eye wear with passively polarized lenses or rapidly alternating shuttered glasses. However, such mechanisms burden a user with encumbrances which can block eye gaze or cover the user's face.

In contrast, an autostereoscopic (AS) display presents stereo imagery to a viewer without the need for special glasses. Three basic types of autostereoscopic displays include: holographic, volumetric, and parallax.

Holographic autostereoscopic displays may be produced by illuminating an object with coherent light (e.g., from a laser) and, without using lenses, exposing a film (or other medium) to light reflected from the object and to a direct beam of coherent light. When the interference patterns are then illuminated by the beam of coherent light, a three-dimensional image may be observed.

Volumetric autostereoscopic displays create 3-D imagery via the emission, scattering, or relaying of illumination from well-defined regions in (x,y,z) space. In volumetric autostereoscopic displays, a physical mechanism is typically used to display points of light within a volume. Because volumetric displays are not planar, volumetric displays use voxels instead of pixels. Two exemplary types of volumetric displays include multiplanar displays, which have multiple display planes stacked up, and rotating panel displays, where a rotating panel sweeps out a volume.

Parallax autostereoscopic displays may use barriers or lenticular sheets to produce different two-dimensional images across a viewing field. Parallax autostereoscopic displays operate by occluding certain parts of an image from a particular viewing direction while making other parts visible. They provide different imagery to the left and right eyes of a viewer, allowing for 3D perception of a scene. This is commonly achieved by dividing the horizontal resolution of a display surface behind the parallax barrier among several views.

In addition to single-user parallax barrier-based autostereoscopic displays, some conventional autostereoscopic displays support multiple viewers by providing different views for several possible viewing positions. The primary task of any multi-user autostereoscopic display is to deliver the correct and unique view to each eye of each observer. However, a viewer located at a particular viewpoint of a multi-user autostereoscopic display may receive visual interference from an image intended for a viewer located at a different viewpoint because some of the same display pixels may be viewable from both viewpoints. If multiple viewers see the same pixels behind the barrier from different viewpoints and the same pixels should appear differently when viewed from the different viewpoints, then a conflict occurs. In conventional autostereoscopic displays, the visual conflicts may be localized and can cover large areas of the display, depending on viewpoint position. This allows a single viewer to experience correct 3D views from various positions. Examples of conventional parallax barrier autostereoscopic displays include the Mitsubishi Electronics Research Laboratories (MERL) 3D TV system produced by Mitsubishi Electronics Research Laboratories of Cambridge, Mass. which uses projection display with lenticular elements and the 3D Intelligent Display Solution produced by Philips, Inc. of Amsterdam, Netherlands.

FIG. 1 is a top-view of a conventional multi-user autostereoscopic display illustrating two "repeat" stereoscopic viewpoints and two monoscopic viewpoints. Referring to FIG. 1, conventional AS display system 100 may include display 102 and parallax barrier 104. Display 102 may include a rear-projection or emissive display such as a liquid crystal display (LCD). Display 102 may include an array of pixels, where each pixel is capable of emitting a single frequency of light (e.g., color) at a given point in time. Conventional parallax barrier 104 may include a material capable of blocking light emitted from display 102 from reaching viewers located on the opposite side of barrier 104 from display 102. Conventional parallax barrier 104 may also include a regular pattern of holes allowing for a portion of light emitted from display 102 to be observed by viewers using conventional AS display system 100. For example, in two dimensions, a regular hole pattern may include a grid such that holes are spaced at regular intervals from each other in both the horizontal and vertical directions. However, it is appreciated that for simplicity of illustration, the top-view shown in FIG. 1 includes a regular pattern in one dimension whereby holes are located at regular intervals in only the horizontal direction. This may hereinafter be referred to as a "display scan line."

One problem associated with conventional multi-user parallax barrier-based AS displays is that, in order to preserve horizontal resolution, such displays have a limited number of distinct views, typically eight to ten. Autostereoscopic displays often require sizing individual views to the scale of the interpupillary distance of a user, approximately 6 cm. At the optimal distance where this spacing occurs, the maximum width of the display's views is, therefore, approximately half a meter. This leads to two fundamental problems for groups of users viewing such an autostereoscopic display. Due to the regular pattern of conventional parallax barriers, each view repeats in front of the display at the regular interval of the view repeat distance. When one viewer is viewing the display in one area, any other viewer must be restricted from entering any of the repeat areas or the other viewer will see the same output as the first viewer when the other viewer should see different output. This severely limits the lateral movement and potential viewing positions for additional viewers.

Another problem associated with conventional AS displays is that the number and location of unique viewpoints that are different distances away from display 102 may also be limited. When a viewer is located close to display 102 and barrier 104, the angles between the light rays transmitted from the viewable pixels and converging on the viewer may be large. As a result, the gaps between pixels viewable through barrier 104 may be large. In contrast to a viewer located close to display 102, the angles between the light rays transmitted from the viewable pixels and converging on a viewer located far away from display 102 may be small. Typically, given the proximity of barrier 104 to display 102 (e.g., centimeters) and the relative distance between a viewer and barrier 104 (e.g., a few meters), light rays transmitted from display 102 that converge on a viewer are virtually parallel. As a result, the spacing between viewable pixels for viewers located at viewpoints that are far away from display 102/barrier 104 is small compared to viewers located closer to display 102/barrier 104. Because the spacing between viewable pixels is smaller for far viewpoints, more pixels are viewable and therefore the sampling frequency is higher (i.e., pixels are sampled more frequently than for viewers located closer to display 102/barrier 104).

For a regular barrier display, a viewer located at a first (calibrated) distance will sample the pixels at a particular frequency corresponding to the correct spacing for the zones. However, viewers located at different distances from the display will sample the display at frequencies that do not correspond to the regular spacing of viewing zone pixels. The superposition of such pixel sets may lead to an undesirable pattern of pixels observable at the two viewpoints simultaneously, no matter what the lateral positions of the viewers. Thus, viewers located at different distances from a regular barrier display may be undesirably restricted to approximately the same distance from the display in order to avoid this undesirable view interference.

For example, in FIG. 1, viewpoint 116 may be located at a first distance from barrier 104 such that a viewer located at viewpoint 116 observes a portion of display 102 through the regular pattern of holes in barrier 104. As shown in FIG. 1, a viewer located at viewpoint 116 may observe display area 106 through a first hole, display area 108 through a second hole, and display area 110 through a third hole. A viewer located at viewpoint 118 may observe a different area of display 102 through the same pattern of holes in barrier 104. The display area viewable by the viewer located at viewpoint 118 may overlap the display area viewable by viewpoint 116, which may result in undesirable visual interference for one or both of viewpoints 116 and 118. Specifically, the viewer located at viewpoint 118 may observe display area 106 through the first hole, display area 112 through the second hole, and display area 114 through the third hole. Because the spacing of the intersections of rays from viewpoint 116 is greater than the spacing of the intersection of rays from viewpoint 118, fewer areas on display 102 are viewable to a viewer located at viewpoint 116 than one located at viewpoint 118. As a result, a viewer located at viewpoint 116 may "sample" display 102 at a lower frequency, while a viewer located at viewpoint 118 may "sample" display 102 at a higher frequency.

Other types of conventional autostereoscopic displays may utilize user tracking systems to provide the correct view for multiple viewpoints. User tracking (e.g., head tracking) relies on finding the position of a person relative to the display and adjusting the display contents to give the illusion of looking through a window into a 3-D environment. Conventional head-tracking systems may use facial and/or head recognition software in order to locate the user in the room. However, the head tracking induced 3D effect only works the person whose head is being tracked and untracked users may not get the same effect. Therefore, with regular barrier, multi-user autostereoscopic displays, untracked users must remain in certain viewing areas or they will see incorrect imagery.

Interference between views may produce a form of aliasing resulting in various undesirable visual artifacts such as jagged edges and/or Moiré patterns. Aliasing is a long recognized problem in computer graphics and solutions include pre- and post-filtering images as well as supersampling. Although filtering methods for antialiasing in autostereoscopic displays have been proposed, these operate on image quality and depth-of-field rather than between views. Moreover, using supersampling to overcome the aliasing problems associated with regular barrier displays is not possible because the barrier pattern fixes the sampling rate of the underlying display.

Yet another limitation of many conventional parallax barrier autostereoscopic displays is low brightness and resolution. For example, a typical eight-view regular parallax barrier display may block ⅞ of the light emitted from the backing display panel or projector, and have only ⅛ of the full horizontal resolution. As a result, viewers of conventional parallax displays may have difficulty reading text or discerning fine details of images. Viewers may also have difficulty observing images in low-light conditions or from larger distances where brightness may be an issue.

Accordingly, in light of these difficulties, a need exists for improved methods, systems, and computer readable media for generating autostereo three-dimensional views of a scene for a plurality of viewpoints.

SUMMARY

Methods, systems, and computer readable media for generating autostereo three-dimensional views of a scene for a plurality of viewpoints are disclosed. According to one system, a display is configured to display images from plural different viewpoints using a barrier located in front of the display, where the barrier has a pseudo-random arrangement of light ports through which images on the display are viewable. A renderer coupled to the display simultaneously renders images from the different viewpoints such that pixels that should appear differently from the different viewpoints are displayed in a predetermined manner. The pseudo-random arrangement of the light ports in the barrier smoothes interference between the different viewpoints as perceived by viewers located at the different viewpoints.

A method for generating autostereo three-dimensional views of a scene for a plurality of viewpoints is also disclosed. According to one method, a display is provided for simultaneously displaying images from plural different viewpoints. A barrier located in front of the display is provided, where the barrier has a pseudo-random arrangement of light ports through which the images are viewable. Images are rendered from the plural different viewpoints and the images are simultaneously displayed on the display such that pixels that should appear differently from the different viewpoints are displayed in a predetermined manner and wherein the arrangement of light ports in the barrier smoothes interference between different viewpoints as perceived by viewers located at the different viewpoints.

The subject matter described herein for generating autostereo three-dimensional views of a scene for a plurality of viewpoints may be implemented using a non-transitory computer readable medium to having stored thereon executable instructions that when executed by the processor of a computer control the processor to perform steps. Exemplary computer readable media suitable for implementing the subject matter described herein include non-transitory computer readable media, such as chip memory devices or disk memory devices accessible by a processor, programmable logic devices, and application specific integrated circuits. In addition, a computer readable medium that implements the subject matter described herein may be located on a single computing platform or may be distributed across plural computing platforms.

DEFINITIONS

As used herein, the terms "autostereoscopic" or "autostereoscopy" refer the process of displaying three-dimensional images that can be viewed without the use of special headgear or glasses on the part of the user. These methods produce depth perception in the viewer even though the image may be produced by a flat device. Exemplary types of conventional autostereoscopic 3D displays include: lenticular lens- or parallax barrier-based displays, volumetric displays, and holographic displays.

As used herein, the term "monoscopic" or "monoscopy" refers to the observation of an image from a single viewpoint. For example, a single eye of a human observer is a monoscopic viewpoint.

As used herein, the term "pseudo-random" refers to something generated or obtained using a finite, nonrandom computational process. In other words, pseudo-random values refer a set of values that is statistically random but is derived from a known starting point. Pseudorandom sequences may, therefore, exhibit statistical randomness while being generated by an entirely deterministic causal process.

As used herein, the term "barrier" refers to a physical device or material that blocks, obstructs, or impedes the transmission of light.

As used herein, the term "light port" refers to a light-transmissive area of a barrier. A light port may include an opening, aperture, gap, perforation, portal, slit, or region of light-transmissive material surrounded by an area of non-light-transmissive material in a barrier.

BRIEF DESCRIPTION OF THE DRAWINGS

The subject matter described herein will now be explained with reference to the accompanying drawings of which.

DETAILED DESCRIPTION

Figure 1:
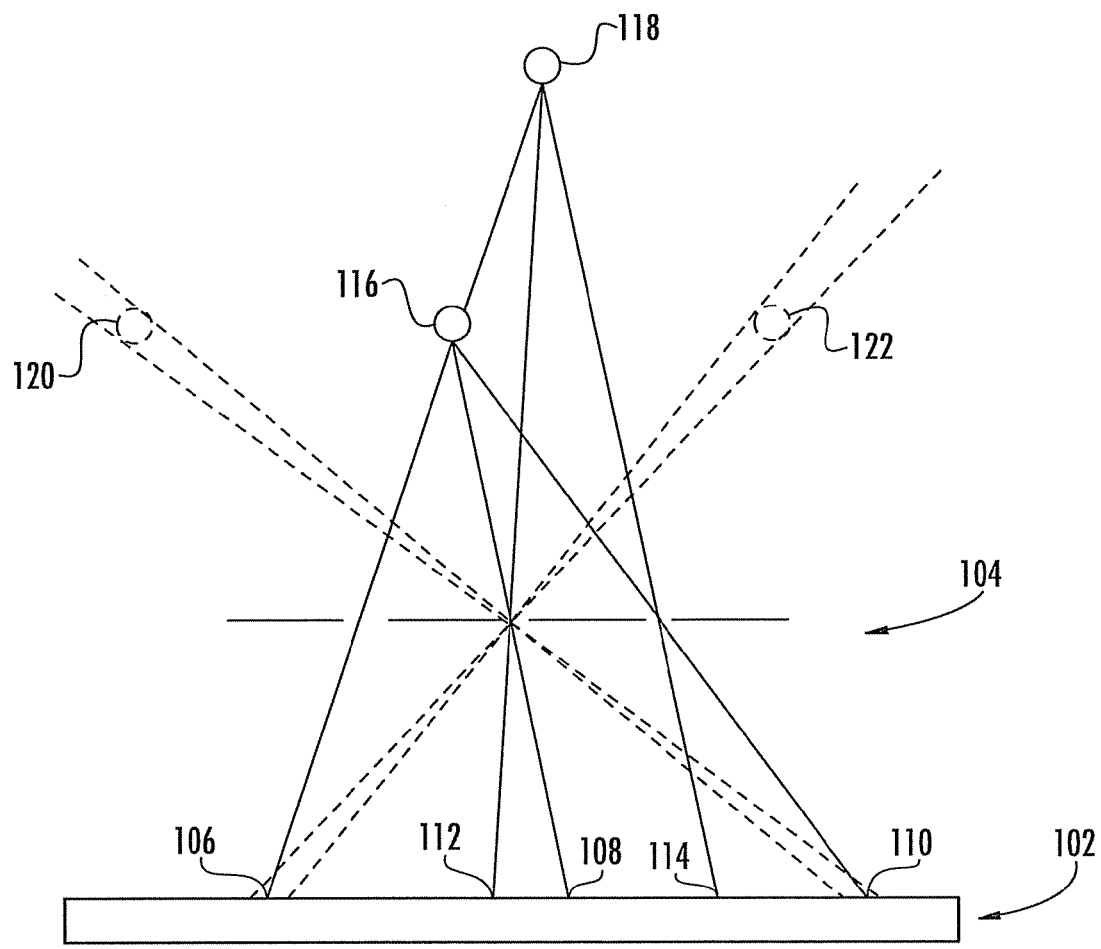
FIG. 1 is a top view of a conventional parallax barrier autostereoscopic display including two repeat stereoscopic viewpoints and two monoscopic viewpoints.

The subject matter described herein now will be described more fully hereinafter with reference to the accompanying illustrative figures, in which various embodiments of the subject matter described herein are shown. The subject matter described herein may, however, be embodied in many different forms and should not be construed as limited to the embodiments set forth herein. Rather, these embodiments are provided so that this disclosure of the subject matter described herein will be thorough and complete, and will fully teach and describe the subject matter described herein to those skilled in the art. Although specific terms are employed herein, they are used in a generic and descriptive sense only and not for purposes of limiting the scope of the subject matter described herein as defined by the attached claims in any way. Some terminology may be defined herein and used to describe forthcoming embodiments of the subject matter described herein in order to teach the subject matter described herein to those skilled in the art. Terms not described explicitly in this disclosure should be construed as they would by those skilled in the art. Unless otherwise expressly limited, all terms used herein including technical and scientific terms, whether defined herein or not, are intended to have the broadest possible meaning as understood by one of ordinary skill in the art. It will be further understood that terms not explicitly defined herein should be interpreted as having the broadest possible meaning or meanings found in commonly used dictionaries, consistent with their meaning in the context of the relevant art. Some terms will be explicitly defined herein and used to describe embodiments of the subject matter described herein to those skilled in the art. Terms defined explicitly herein should be interpreted as the broader of their definition herein and their dictionary meanings. These defined terms should accordingly be construed according to their broadest possible meaning to skilled artisans in this field.

The Figures are provided for illustrative purposes and to assist in understanding the subject matter described herein, and should not be viewed as precision blueprints or perfectly scaled drawings. In the drawings provided, the dimensions of features or regions may be exaggerated for clarity, readability, or the like. Features in the Figures may not be exactly to scale. The Figures are provided to show example embodiments of the subject matter described herein. Thus, embodiments of the subject matter described herein should not be construed as limited solely to the particular Figure or Figures illustrated herein but may include variations and deviations from many sources. As used herein the term "and/or" includes any and all combinations of one or more of the associated list items. Further, as used herein the term "at least" includes the number specified plus more than the number specified, unless explicitly limited otherwise.

As used herein, the singular forms "a", "an" and "the" are intended to include the plural forms as well, unless the context clearly indicates otherwise. It will be further understood that the terms "comprises" or "comprising," when used in this specification, specify the presence of stated features, steps, operations, elements, and/or components, but do not preclude the presence of one or more additional features, steps, operations, elements, components, and/or combinations thereof. Moreover, terms such as "horizontal," "vertical" and "perpendicular" indicate general directions or relationships rather than precise 0° or 90° orientations. Ranges and angles are approximate and are provided merely to illustrate the subject matter described herein.

It is appreciated that the subject matter described herein includes several advantages compared with conventional regular pattern parallax barrier-based autostereoscopic displays. The pseudo-random hole-based AS display described herein eliminates the repeating zones found in regular barrier and lenticular autostereoscopic displays, enabling multiple simultaneous viewers in arbitrary locations and a greater range of viewing distances. Additionally, by pseudo-randomizing the barrier hole pattern, the aliasing interference between views is changed to high frequency noise, which is less visually objectionable than regions of conflict or repeating patterns. This interference is further mitigated by comparing the image pixels and optionally displaying pixels seen by multiple views. By randomizing the barrier pattern, the pseudo-random hole-based AS display system described herein may exhibit a small amount of conflict between viewers, distributed across the display in all situations, yet it may not exhibit the conflicts between multiple views that are inherent in conventional autostereoscopic displays.

Another advantage of the pseudo-random hole-based AS display described herein is that observed images may be brighter than with conventional systems. By allowing for a small number of pixels to be seen in multiple views, the pseudo-random hole display described herein can be brighter than a conventional regular barrier with an equivalent number of views. Regular barrier displays cannot allow individual pixels to be seen by multiple users because the regularity of the barrier pattern would mean many pixel conflicts in a localized area. With a pseudo-random hole distribution, visual conflicts will be randomly distributed across the entire viewing area and the conflicting pixels may be turned off.

Figure 2:
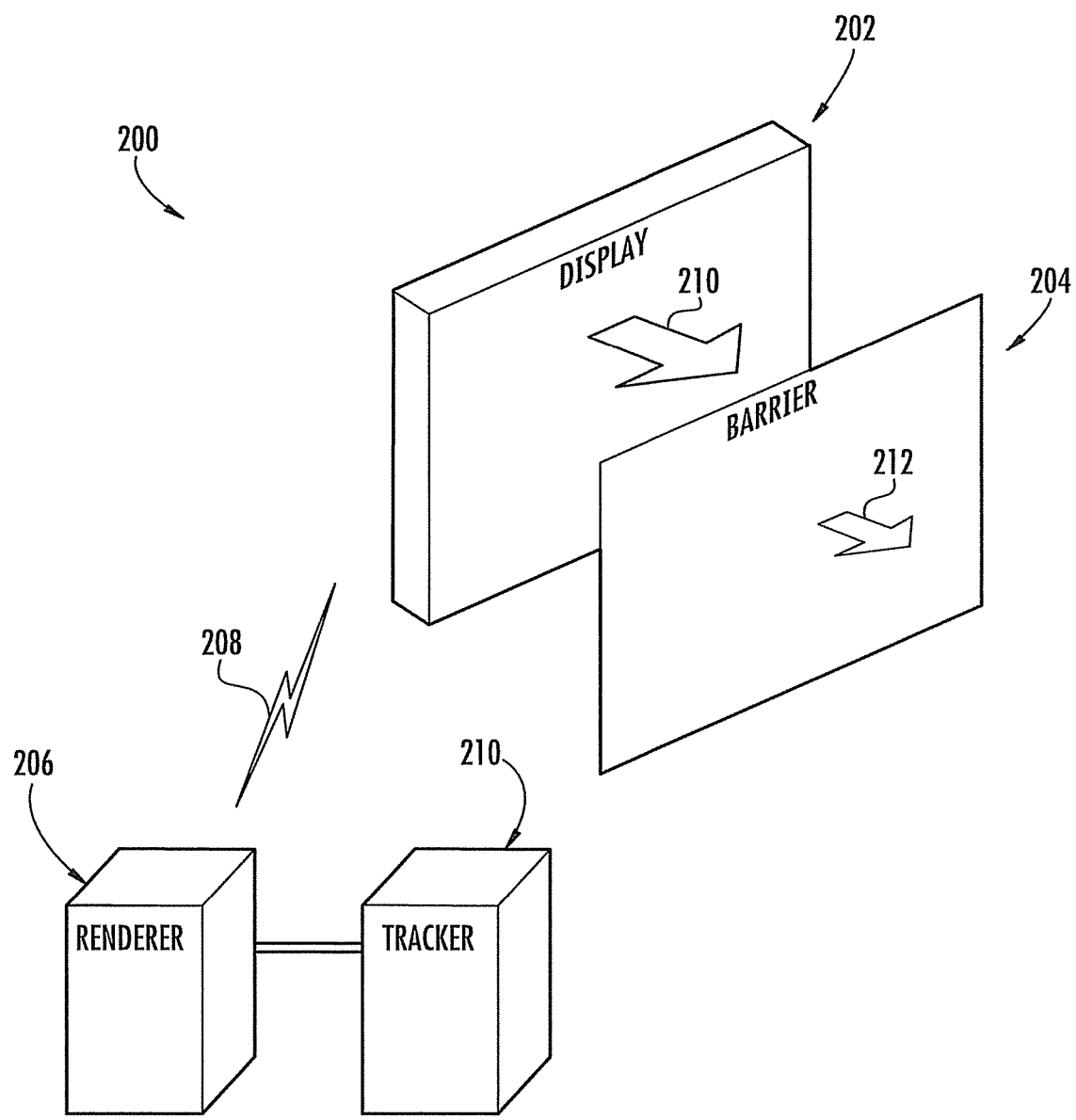
FIG. 2 is a block diagram depicting an exemplary autostereoscopic display system including a pseudo-random hole barrier according to an embodiment of the subject matter described herein.

FIG. 2 is a block diagram depicting of an exemplary system for generating autostereo three-dimensional views of a scene for a plurality of viewpoints according to an embodiment of the subject matter described herein. Referring to FIG. 2, pseudo-random hole AS display system 200 may include display 202, pseudo-random hole barrier 204, renderer 206, communications link 208, and tracker 210. Image data may be sent from renderer 206 for display on display 202. Pseudo-random hole barrier 204 may be located in front of display 202 and contain a pseudo-random arrangement of light ports (e.g., holes) through which different views of an image are viewable. By pseudo-randomizing the arrangement of light ports in barrier 204 and coordinating displayed images with display 202 and renderer 206, repeating zones found in conventional regular barrier and lenticular autostereoscopic displays may be eliminated, thus enabling multiple simultaneous viewers to be located in arbitrary locations. Components of pseudo-random hole AS display system 200 will be described separately in greater detail below.

Display 202 may include any suitable device for visually representing information received from renderer 206. For example, display 202 may include a device containing an array of pixels, each pixel being capable of emitting a single frequency of light (e.g., color) at a given point in time. Exemplary types of displays 202 may include: cathode ray tube (CRT), plasma display panel (PDP), liquid crystal display (LCD), digital light processing (DLP), liquid crystal on silicon (LCoS), laser, surface-conduction electron-emitter display (SED), field emission display (FED), electrophoretic display (EPD), light emitting diode (LED), organic LED (OLED), quantum dot LED (QDLED), and interferometric modulator (IMOD) displays. In order to properly display different views of an image at one or more predefined viewpoints, pseudo-random hole autostereoscopic display system 200 may be calibrated for each particular viewpoint. Details of exemplary display calibration will now be described in greater detail below.

Display Calibration

In one embodiment, pseudo-random hole autostereoscopic display system 200 may be calibrated for a particular viewpoint with a pair of high resolution cameras at a desired stereo viewing location. For example, stereo views may be calibrated at various distances from the display, as close as 50 cm and as far as 4 m. For an hxv resolution display, the display may be calibrated with a binary coding (such as a Gray code) to uniquely identify display pixel visibility with ($\log_2$ h+$\log_2$ v) images. However, using Gray codes may result in lighting the display with bright regions which may lead to edge detection issues in the camera. A compromise between speed and sensitivity may be accomplished using a line sweep in the horizontal and vertical directions, for a total of (h+v) images. To uniquely identify each visible display pixel, all camera image pixels with values above a specified threshold may be labeled with the value of the display scan line. This may generate a mask of all visible display pixels from a given camera position.

The masks produced by this calibration may be passed to a renderer 206 along with desired imagery for each view. By comparing masks for each view, the visibility of each display pixel may be determined. Some pixels may be seen from only a single viewpoint, resulting in portions of corresponding imagery being displayed as expected. Other pixels may not be seen by any view and remain black. Pixels that are seen by multiple views may create interference. A pixel with similar colors in all of the masked imagery may remain active, but one with differently contributing color values may be set to black. In addition to examining the locations of one or more desired viewpoints, calibration of display 202 may include coordinating with the design of barrier 204. For example, the pattern of light ports in barrier 204 and the distance between display 202 and barrier 204 may affect the quality of the views observable by viewers located at various viewpoints.

Barrier Design

Pseudo-random hole barrier 204 may include a physical device or material that blocks, obstructs, or impedes the transmission of light. Light 210 emitted from display 202 may encounter pseudo-random hole barrier 204. Each of the viewpoints, for example may view a separate image. Low frequency and medium frequency interference among the separate images may be smoothed by the pseudo-random hole barrier 204.

In one embodiment, barrier 204 may include a parallax barrier consisting of a fixed planar barrier in front of the native display surface 202. Pseudo-random hole barrier 204 may contain clear holes in a non-uniformly-distributed pseudo-random pattern. Only a small fraction of the surface area of barrier 204 may consist of light ports so that, from any single viewing position, only a small fraction of display surface 202 may be visible. Thus, the collection of these tiny light ports may restrict the view from any 3D position in front of display 202 to a subset of regions on the projection surface. The arrangement of the light ports in barrier 204, their size and density, as well as the distance between barrier 204 and display surface 202 may be constructed so as to minimize the overlap between visible regions of multiple eyes. As the number of observers increases, and thus the number of views increases, the fraction of overlap regions may increase, thereby degrading the image quality for all views. However, this degradation can be countered by decreasing the density of light ports. In turn, the resulting decrease in the image brightness can be countered by increasing the brightness of the backlight in the display. In another embodiment, barrier 204 light ports may be replaced with a pseudo-randomly distributed lenslet array to increase light utilization for a brighter display and to eliminate the black gaps.

In one embodiment, pseudo-random hole patterns may be generated to favor multiple eyes and viewers along the horizontal axis, with higher distribution density along the vertical axis. This will provide brightness and resolution for viewpoints where viewers are more likely to be located. For example, in a conference room setting, users are typically seated around a shared table. Therefore, users are more likely to be located within a narrow vertical window, but be spread across a wide horizontal area. There may be less need to optimize for those viewpoints located outside of the narrow vertical area (e.g., standing positions, near the ceiling or the floor, etc.) while there may be a greater need for differentiating and optimizing between viewpoints bunched in the horizontal direction (e.g., for each viewer seated at the shared table).

In another possible embodiment, pseudo-random hole AS display system 200 may be optimized for a particular viewer. For example, the CEO of a company may have the best (i.e., brightest, highest-resolution, fewest conflicts with other views) view of display 202 compared with other viewers. This may be accomplished either by locating the viewer at the optimum viewpoint or using user-tracking and dynamically adjusting the display system characteristics in response to the user's location. In other embodiments, the optimized user may simply pay for the privilege of having the best viewpoint, or viewpoints may be categorized into tiers based on various metrics and users may pay to be located at viewpoints based on the tier to which the viewpoint belongs.

Renderer

Generally, renderer 206 may render images from plural viewpoints in a predetermined manner so that, when combined with barrier 204, pixels that should appear differently from different viewpoints do appear differently from different viewpoints. Renderer 206 may include a device configured to simultaneously render images from plural viewpoints such that pixels that should appear differently from different viewpoints are displayed in a predetermined manner. As used herein, the term "render" may refer to a process of converting graphics from a file format into a visual form, as on a video display. For example, renderer 206 may include a personal computer, single- or multi-blade server, server farm, or other computational device having video output. Renderer 206 may be connected (e.g., communicatively coupled) to display 202 via a suitable communications interface 208 for transmitting video information to display 202. Exemplary connection types 208 may include Ethernet, gigabit video interface (GVIF), DisplayPort, high-definition multimedia interface (HDMI), video graphics array (VGA), and digital video interface (DVI). In the embodiment shown in FIG. 2, renderer 206 is separately located from display 202. However, it is appreciated that renderer 206 may also be incorporated with display 202 without departing from the scope of the subject matter described herein.

Renderer 206 may send at least one image 208 to display 202. For example, renderer 206 may transmit composite image data 208 to display 202 via a standard DVI cable. Using image data 208, display 202 may emit light 210 corresponding to an image. Light 210 may hereinafter be referred to as "unfiltered" light 210. Unfiltered light 210 may then encounter pseudo-random hole barrier 204 where a portion of (unfiltered) light 210 may be blocked. As (unfiltered) light 210 passes through the pseudo-random arrangement of holes in barrier 204, the amount of (unfiltered) light 210 observable by a viewer located on the opposite side of barrier 204 (as compared with display 202) is less, often significantly less, than that of (unfiltered) light 210. This fact is reflected in the smaller size of the arrow representing (filtered) light 212, indicating that fewer pixels of display 202 are viewable when barrier 204 is located in front of display 202. As used herein, the term "filtered" light 212 refers to light emitted from display 202 that has passed through or been partially blocked by barrier 204. The result may be that the image presented to a viewer (i.e., "filtered" light 212) is of a lower resolution and/or lower intensity (i.e., brightness) than an image corresponding to (raw unfiltered light 210.

In another embodiment, AS display system 200 may track users and generate masks for every viewing position in each frame using, for example, a real-time masking technique.

In another embodiment, AS display system 200 may be combined with an active barrier, allowing optimal light port density for different numbers of viewers.

Figure 3:
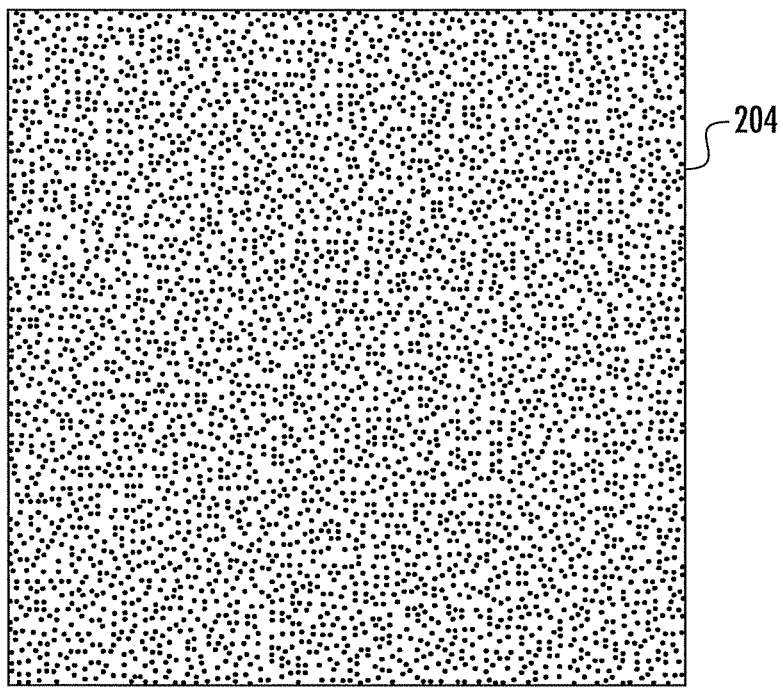
FIG. 3 is a close-up view of a pseudo-random hole barrier illustrating an exemplary distribution of holes or light ports according to an embodiment of the subject matter described herein.

FIG. 3 is a close-up view of a barrier 204 shown in FIG. 2. Referring to FIG. 3, light ports in barrier 204 may be distributed using the Poisson disk distribution, which enforces a minimum distance between randomly placed sample points. This ensures uniform distribution over the larger pattern and trades off perceptually difficult low and mid frequency noise for less troublesome high frequency noise. In one embodiment, a stochastic sampling may be applied to the construction of multi-view display system 200 by constructing parallax barrier 204 using a Poisson disk pattern of light ports. By randomizing light port distribution in barrier 204, visual conflicts between views may be distributed across the viewing area as high frequency noise, and can be minimized by changing the parameters of the barrier 204 design.

For example, the barrier field may be divided into pixels from which a single subpixel is chosen, based on a specified fractional fill factor (e.g. ¼, ⅛, ⅑, etc.). A Poisson disk distribution is a mathematical expression of the probability of a hole occurring within a fixed two-dimensional area given a desired average number of holes per unit of area. One problem with truly random patterns is that samples may bunch together in places while leaving large gaps in other areas. In contrast to a truly random distribution, a Poisson disk distribution randomly places samples but with a minimum distance constraint ensuring that no two samples are too close. Such a distribution trades off aliasing for noise, like a random sampling, but ensures more even coverage. It is appreciated that other hole distributions may also be used without departing from the scope of the subject matter described herein. Additional exemplary distributions may include a Gaussian (i.e., Normal) distribution.

In one embodiment, the barrier pattern shown in FIG. 3 may be produced using a custom film barrier attached to a plastic spacer and exposing the film using a computed tomography (CT) scanner film printer. One drawback to this may be that undesired reflections between display 202 and barrier 204 are produced. Therefore, in other embodiments, barrier 204 may instead include physical holes to allow light to pass without significant reflections between the barrier and display. In one embodiment, holes in pseudo-random hole barrier 204 may be laser cut into a sheet and may be square-, circular-, or rectangular-shaped, or any combination thereof. For typical display sizes and viewing distances, holes in pseudo-random hole barrier 204 may each be approximately 1/100 of one inch in size and have a 2/100" minimum spacing constraint. In other words, each hole in pseudo-random hole barrier 204 may be located at least 0.02 of one inch apart from every other hole. As mentioned above, a purely random hole distribution may not satisfy this constraint. It may be important to have holes satisfy a minimum spacing between one another for many reasons. For example, the mechanical integrity of barrier 204 may be compromised if too many holes overlap one another creating, in effect, a larger hole. Also, the closer together holes are located, the more difficult it may be to prevent view interference between multiple viewpoints.

Figure 4:
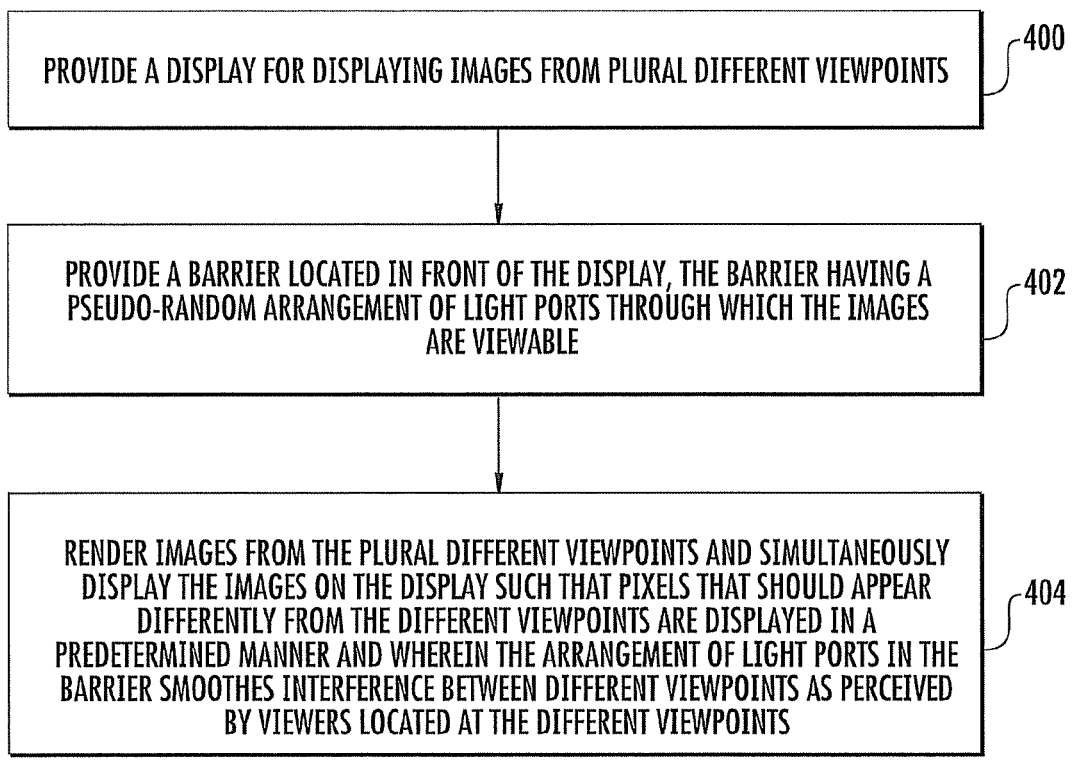
FIG. 4 is a flow chart illustrating exemplary steps for providing an autostereoscopic display including a pseudo-random hole barrier according to an embodiment of the subject matter described herein.

FIG. 4 is a flow chart of exemplary steps for providing an autostereoscopic display including a pseudo-random hole barrier according to an embodiment of the subject matter described herein. Referring to FIG. 4, in step 400, a display is provided for simultaneously displaying images from plural different viewpoints. For example, the display may include an LCD panel.

In step 402, a barrier located in front of the display is provided, where the barrier has a pseudo-random arrangement of light ports through which the images are viewable. For example, the barrier may be an opaque screen having a plurality of holes and located approximately one inch in front of the LCD panel.

In step 404, images are rendered from the plural different viewpoints and the images are simultaneously displayed on the display such that pixels that should appear differently from the different viewpoints are displayed in a predetermined manner and wherein the arrangement of light ports in the barrier smoothes interference between different viewpoints as perceived by viewers located at the different viewpoints. For example, in a display system installed in the dash of a car, it may be desirable to display map/navigation information to the driver (i.e., a first viewpoint) while displaying a movie or other information to the passenger (i.e., a second viewpoint). Because each of these viewpoints, as well as the location of the display, may be fixed, these viewpoints may be optimized for presenting different views of the same image.

It may be appreciated that as additional viewers observe the display, the interference may increase as each new view interferes with all existing views. For example, smoothing interference between different viewpoints may include using one or more different blending methods for combining masked images from several views. Several blending methods will now be described in greater detail below.

The "blank" blending method may include simply turning off any conflicting pixels. This "blank" method eliminates active interference between views, but reduces the overall brightness and resolution. When multiple viewers are looking at similar scenes, as in the different perspectives of a single remote scene in group tele-immersion, it is likely that many conflicting pixels will have similar colors. Therefore, in other possible embodiments, the pseudo-random hole-based AS display described herein may mitigate viewing conflicts by blending the similar colors of desired views rather than turning off conflicting pixels. By allowing those pixels to stay on in a blended color makes the conflicting pixels seen by multiple viewers more aesthetically pleasing and the resulting views less distorted.

The "similar" method includes blending only interfering pixels of similar color and turning off the others. For example, pixels having colors within 12.5% of the maximum value may be blended and all other pixels may be turned off. This method The "random" blending method includes randomly selecting one of the colors appropriate for one of the conflicting pixels. For example, consider a situation where the same pixel is viewable by three different viewpoints, where the pixel should be red for the first viewpoint, green for the second viewpoint, and blue for the third viewpoint. According to the random blending method, one of red, green, or blue will be randomly selected for the pixel.

The "average" blending method includes averaging the colors between the colors for each of the conflicting pixels. For example, considering a situation where a pixel is viewable by two different viewpoints and the pixel should be red for the first viewpoint and yellow for the second viewpoint. According to the average blending method, the pixel may be displayed as orange (i.e., the average of red and yellow.) This may be less objectionable visually to each viewer approximately equally, while being sub-optimal for both as well.

The peak signal-to-noise ratio (PSNR) may be used to measure the quality of the blended image. The source signal is the original unblended view, consisting of all pixels visible from a single view. The noise is the error introduced by blending that view with one or more additional views, by one of the various methods describe above. A higher PSNR reflects a blended view that is closer to the original unblended view. PSNR values are given in decibels (dB), with values above 20 dB typically considered acceptable for compression codecs.

PSNR is defined using the mean squared error (MSE) for two m×n color images I and K, which is defined as:

$$MSE = \frac{1}{3mn}\sum_{i=0}^{m-1}\sum_{j=0}^{m-1} \|I(i,j) - K(i,j)\|^2$$

And PSNR is defined as:

$$PSNR = 20 \cdot \log_{10}\left(\frac{MAX_I}{\sqrt{MSE}}\right)$$

$MAX_I$ is the maximum possible pixel value of the image. Since all of the images are 8 bits per pixel, $MAX_I$ is 255. Identical images will have zero MSE and an infinite PSNR. We apply PSNR measurements to several combinations of views and for several different source image sets.

The blank blending method produces the worst results. When blending two simple views, with the "Numbers" data set, turning off conflicting pixels has relatively little effect. However, when the source imagery contain larger area in each view, conflicts increase and are turned off, leading to large areas of black. This is a significant difference from the original content, and the calculated PSNR values indicate that this would not be acceptable for a viewer.

The similar blending method produces better PSNR than the blank method, primarily for a stereo pair. The similar metric is able to blend two views in the "Background" data set with 16 to 18 dB PSNR because large areas of the backgrounds are a similar color. However, when used to blend four views, the quality of the output imagery ranges from approximately 12 to 15 dB, which is below the useful threshold. Even though large parts of the background are similar between views, there is more conflict in the other areas, especially around object edges. These results imply that this is not an acceptable blending method for most cases.

The random and average blending methods produce significantly better PSNR measurements, in all conditions, than the previous two. In several cases, they exceed 30 dB, with the average method peaking at 39.48 dB for view 3 when blending between views 3 and 4 using the "Numbers" data set. The average method generally produces the highest PSNR values when four views are blended and random produces better values when only two views are blended. Because these two methods are perceptually superior to the methods that force conflicting pixels to black, we recommend that blending between views combine between or choose one of the active values.

Figure 5A:
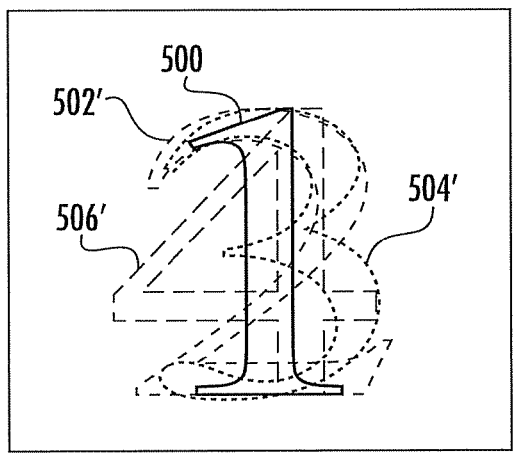
FIGS. 5A-5D are line drawings of exemplary images that may be simultaneously viewable from different viewpoints while utilizing an autostereoscopic display including a pseudo-random hole barrier according to an embodiment of the subject matter described herein.
Figure 5B:
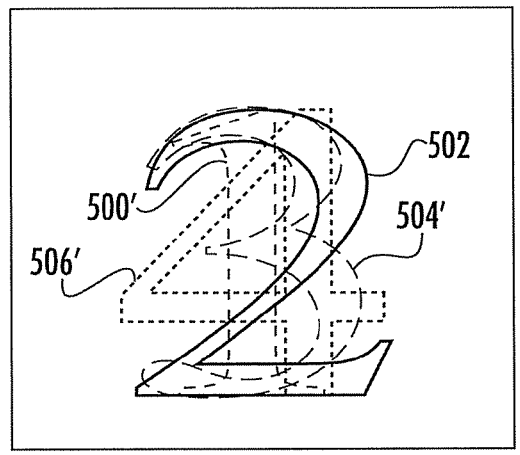

FIGS. 5A-5D are line drawings of exemplary images that may be simultaneously viewable from different viewpoints while utilizing an autostereoscopic display including a pseudo-random hole barrier according to an embodiment of the subject matter described herein. In FIGS. 5A-5D, it is assumed that AS display system 200 is configured to provide four different views to four different viewpoints, where each view is depicted as the number corresponding to its viewpoint. For example, a first viewpoint should see an image of the number one "1", a second viewpoint should see an image of the number two "2", a third viewpoint should see an image of the number three "3", and a fourth viewpoint should see an image of the number four "4". Additionally, it may be appreciated that while a primary view corresponding to a particular viewpoint may be most clearly observed, that undesired leakage (i.e., viewable pixels) between views may be observed. The dominant/desired view may be labeled with a number while undesired "shadow" views may be labeled using prime numbers (i.e., followed by an apostrophe). For example, because views 502, 504, and 506 in FIG. 5A are undesirable visual interference with respect to the first viewpoint, they may be labeled views 502', 504', and 506'.

Figure 5C:
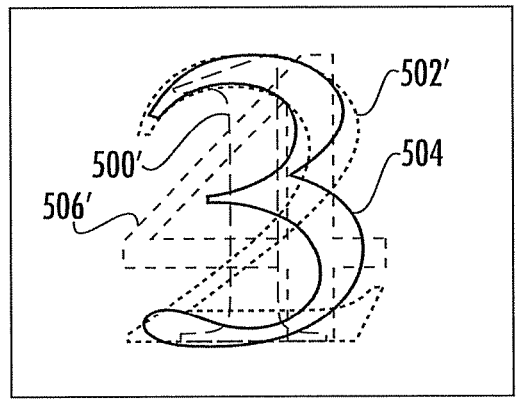
Figure 5D:
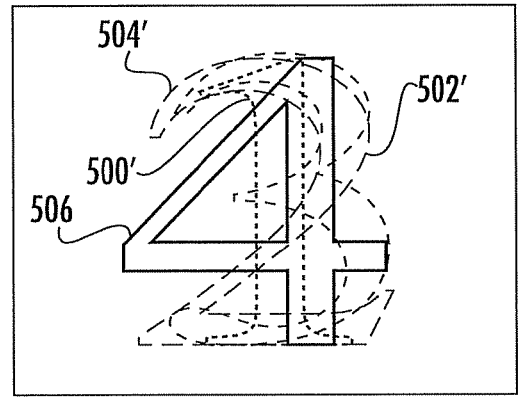

Referring to FIG. 5A, a viewer located at the first viewpoint may observe the strongest and clearest image of view 500. However, fainter images of views 502, 504, and 506 may also be observed. Similarly, referring to FIG. 5B, a viewer located at the second viewpoint may observe view 502 most clearly and observe views 500', 504', and 506' less clearly. Referring to FIG. 5C, a viewer located at the third viewpoint may observe view 504 most clearly and observe views 500', 502', and 506' less clearly. Finally, referring to FIG. 5D, a viewer located at the fourth viewpoint may observe view 506 most clearly and observe views 500', 502', and 504' less clearly.

Figure 6B:
FIGS. 6A and 6B are line drawings of exemplary views of an image that may be simultaneously perceivable by a left eye and right eye through an autostereoscopic display including a pseudo-random hole barrier according to an embodiment of the subject matter described herein.
Figure 6A:

FIGS. 6A and 6B are line drawings of exemplary images simultaneously perceivable by a left eye and right eye viewing utilizing an autostereoscopic display including a pseudo-random hole barrier according to an embodiment of the subject matter described herein. For example, FIG. 6A may correspond to a view presented to a left eye of a viewer and FIG. 6B may correspond to a view presented to a right eye of the same viewer in order to provide an illusion of three-dimensional depth. Referring to FIG. 6A, view 600 may correspond to a computer generated image of a woman's face. In view 600, it may be appreciated that a larger portion of the right side of the woman's face is visible than her left side such that, to a viewer observing view 600, it appears that the woman is looking at a location to the right of the viewer. In contrast to FIG. 6A, FIG. 6B illustrates a different view 602 of the same woman where equal portions of the woman's face are visible to the viewer. Thus, the woman's eyes in view 602 give the impression to the viewer that the woman is looking straight ahead. In this way, different viewpoints may be provided with different views 600 and 602 of the same image (e.g., the woman) and in the case that the left eye of a viewer receives view 600 and the right eye of the viewer receives view 602, the woman may be autostereoscopically perceived.

Figure 7:
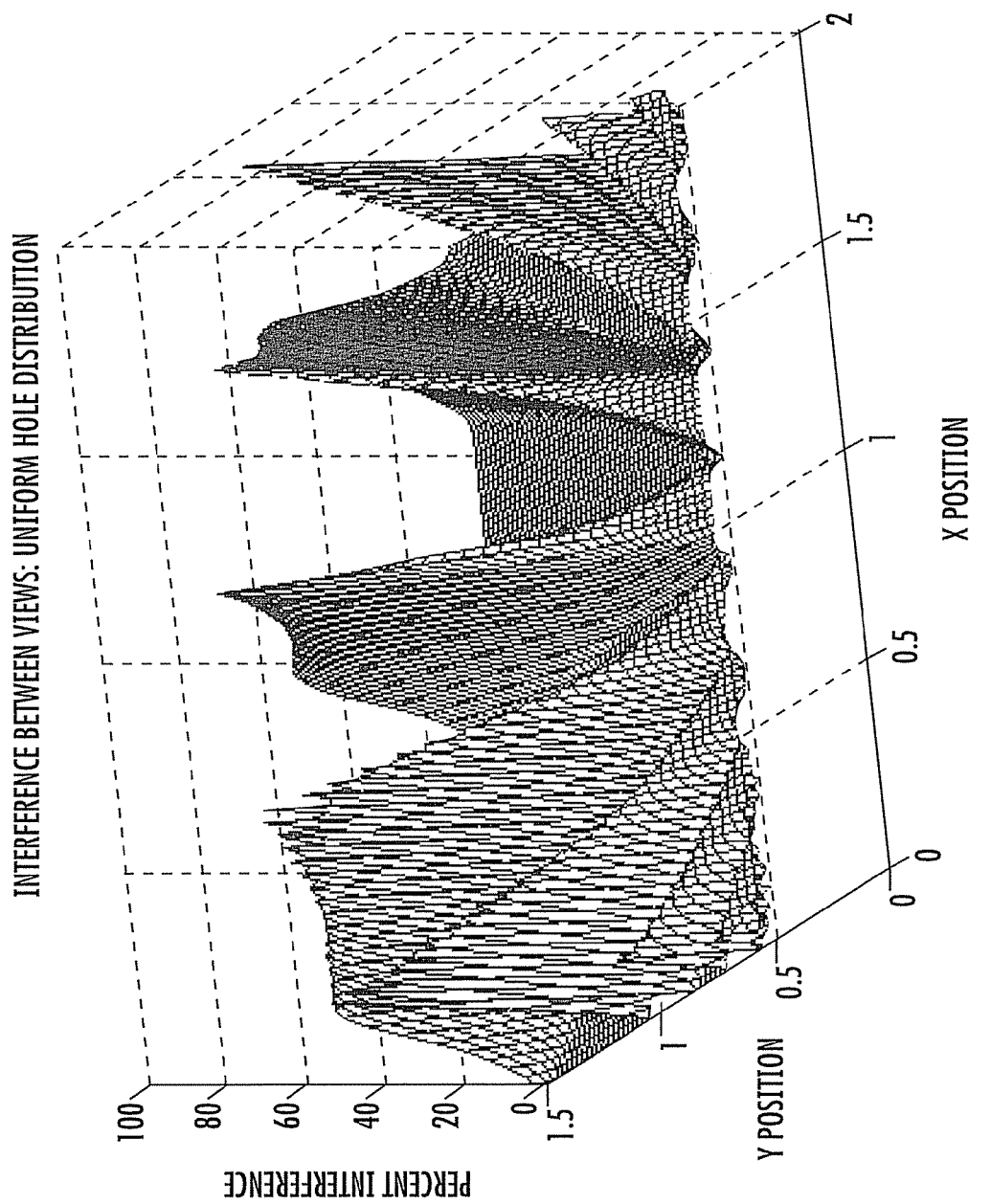
FIG. 7 is a graph plotting perceivable interference at a viewpoint of a conventional regular barrier autostereoscopic display.
Figure 8:
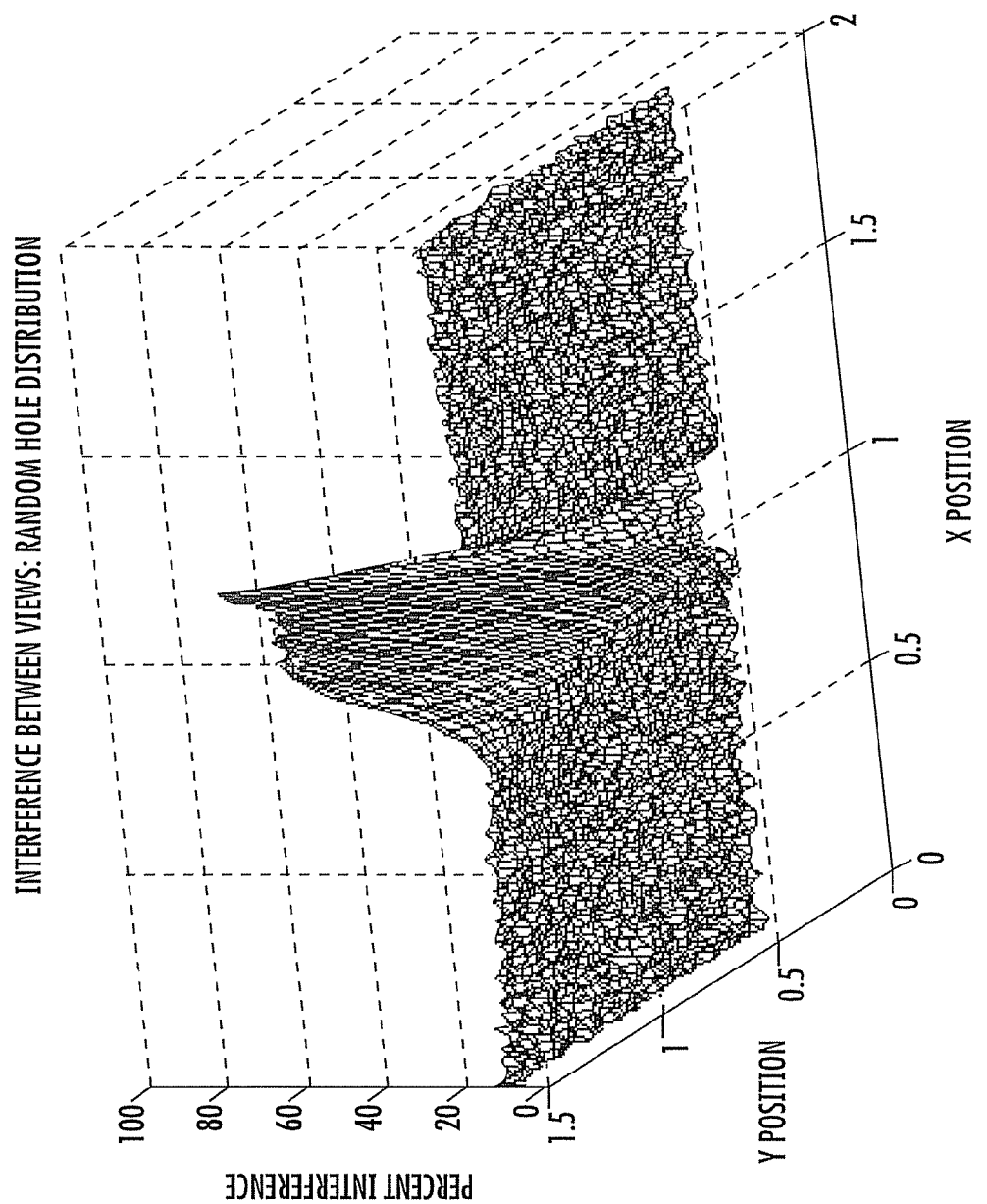
FIG. 8 is a graph plotting perceivable interference at a viewpoint utilizing an autostereoscopic display including a pseudo-random hole barrier according to an embodiment of the subject matter described herein.

FIG. 7 is a graph plotting perceivable interference at a viewpoint of a conventional regular barrier autostereoscopic display and FIG. 8 is a graph plotting perceivable interference at a viewpoint utilizing an autostereoscopic display including a pseudo-random hole barrier according to an embodiment of the subject matter described herein. One difference between a conventional regular barrier autostereoscopic display and one with pseudo-random hole patterns is the distribution of view interference caused by the barrier pattern. As mentioned above, view interference may be produced by display pixels that are seen by more than one viewpoint but which should display different colors corresponding to different views of the image. The total amount of view interference may be measured by the fraction of pixels that are seen by two or more views. In general, the amount of interference for n views in a barrier display is the sum of pairwise intersections of all views. The number of interfered pixels, where i and j are viewing positions and $I_i$ and $I_j$ are the sets of pixels visible from each position, is given by:

$$I_{conflict} = \sum_{i,j=1, i \neq j}^{n} \text{count}(I_n \cap I_j)$$

The average amount of interference between two randomized samples is the product of their sampling frequency. Consider a 3×3 grid of pixels with a single randomly chosen sample. The chance that any particular pixel is selected is 1/9. A second random sample has the same 1/9 chance to select a particular pixel. The chance that these samples end up selecting the same box is the product of the sampling rate, in this case 1/9×1/9=1/81. When a third random sample is introduced, there is a 1/81 chance of intersection with the first sample and a 1/81 chance of intersection with the second, and the overall interference is cumulative, for a 3/81 change of interference. There is a $(1/9)^3$ chance that the same pixel is selected in all three random samples.

When extended to multiple random samples over a larger area, this relation still applies. The amount of interference between any two views is the square of the barrier duty cycle c, the ratio of holes to opaque regions. With each additional view, all existing views may be considered for interference. The number of comparisons is 1 for 2 views, 3 for 3 views, 6 for 4 views, 10 for 5 views, etc. The n-th term of this sequence is given by $(n^2+n)/2$. In a pseudo-random barrier display, the amount of interference for n views is given by:

$$I = \frac{n^2 + 2}{2} \cdot c^2$$

For example, a barrier with a 1/9 duty cycle and two stereoscopic viewers (for a total of four), the average amount of interference is $(4^2+4)/2 \times (1/9)^2 = 10 \times (1/9)^2$, or 12.35% of the total visible pixels. It is appreciated that the amount of interference may grow more quickly with each additional view.

It is appreciated that Fourier transforms of regular barrier, random and Poisson disk distribution patterns may illustrate how evenly light ports are distributed across barrier 204. For example, the Fourier transform of a regular barrier pattern may show strong spikes corresponding to the fixed sampling frequency, while a random pattern may show no structure in the Fourier transform. However, the Fourier transform of a Poisson disk may show a DC spike at the origin and noise beyond the Nyquist limit, resembling a random sampling. The Poisson disk pattern may be, therefore, more evenly distributed than the random pattern which may result in a more uniform light distribution from any given region of display 202. Thus, FIGS. 7 and 8 demonstrate that a non-uniform barrier autostereoscopic display according to the subject matter described herein may have less low-frequency and medium-frequency noise and more high-frequency noise than a conventional regular barrier autostereoscopic display. By substituting high-frequency noise, which is less visually objectionable to viewers than low- and medium-frequency noise, observed autostereoscopic images may appear clearer.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A system for generating autostereo three-dimensional views of a scene for a plurality of viewpoints, the system comprising:
   a display for simultaneously displaying images from plural different viewpoints;
   a parallax barrier located in front of the display, the barrier having a pseudo-random arrangement of light ports through which the images are viewable, wherein the light ports are arranged in a non-uniformly distributed pattern, and wherein the non-uniformly distributed pattern comprises a pseudo-random pattern with a minimum distance constraint that defines a minimum distance that each of the light ports must be separated from every other light port and with desired average number of light ports per unit area; and
   a renderer, coupled to the display, for rendering images from the different viewpoints such that pixels that should appear differently from the different viewpoints are displayed in a predetermined manner and wherein the arrangement of the light ports in the barrier smoothes interference between the different viewpoints as perceived by viewers located at the different viewpoints, wherein the system comprises an autostereo display system that displays images on the display, which is located on a first side of the barrier, to users located on a second side of the barrier opposite the first side.

2. The system of claim 1 wherein the display simultaneously displays the images for the plural viewpoints.

3. The system of claim 1 wherein the barrier is moveable relative to the display.

4. The system of claim 1 wherein the barrier includes a first barrier component and a second barrier component, the first barrier component being moveable relative to the second barrier components, each barrier component having a pseudo-random arrangement of light ports through which the images are viewable moveable relative to the display.

5. The system of claim 1 wherein the barrier is one of an active and a passive barrier.

6. The system of claim 1 wherein the light ports include one of lenslets and alternating clear and opaque strips.

7. The system of claim 1 wherein at least one of the size, density, arrangement, and distance from the display of the light ports is configurable.

8. The system of claim 1 wherein the arrangement of the light ports is dynamically variable.

9. The system of claim 1 wherein the arrangement of the light ports is optimized for a predetermined number of viewpoints.

10. The system of claim 1 wherein the arrangement of the light ports is optimized for a predetermined location of viewpoints.

11. The system of claim 1 wherein the renderer renders images from the viewpoints of the plural users.

12. The system of claim 1 wherein the renderer is configured to render images corresponding to plural viewpoints in arbitrary locations.

13. The system of claim 1 wherein the renderer is configured to blend pixels that are simultaneously viewable by two or more viewpoints.

14. The system of claim 1 wherein the renderer is configured to turn off pixels that are simultaneously viewable by two or more viewpoints.

15. The system of claim 1 wherein the renderer is one of remotely located or integrated with the display.

16. The system of claim 1 wherein the display and the renderer are calibrated with a binary coding scheme to uniquely identify the visibility of each pixel.

17. The system of claim 16 wherein the binary coding scheme includes a Gray code.

18. The system of claim 1 comprising a tracker configured to track the movement of viewers located at the different viewpoints.

19. The system of claim 1 wherein the renderer is configured to generate a mask for each of the plural viewpoints.

20. The system of claim 19 wherein the renderer is configured to generate the mask for each of the plural viewpoints for each frame of the displayed image.

21. A method for generating autostereo three-dimensional views of a scene for a plurality of points of view, the method comprising:
   providing a display for displaying images from plural different viewpoints;
   providing a parallax barrier located in front of the display, the barrier having a pseudo-random arrangement of light ports through which the images are viewable, wherein the light ports are arranged in a non-uniformly distributed pattern, and wherein the non-uniformly distributed pattern comprises a pseudo-random pattern with a minimum distance constraint that defines a minimum distance that each of the light ports must be separated from every other light port and with desired average number of light ports per unit area; and
   rendering, by a renderer, images from the plural different viewpoints and simultaneously displaying the images on the display such that pixels that should appear differently from the different viewpoints are displayed in a predetermined manner and wherein the arrangement of light ports in the barrier smoothes interference between different viewpoints as perceived by viewers located at the different viewpoints, wherein the display, the barrier, and the renderer comprise an autostereo display system that displays images on the display, which is located on a first side of the barrier, to users located on a second side of the barrier opposite the first side.

22. The method of claim 21 wherein displaying the images includes simultaneously displaying the images for the different viewpoints.

23. The method of claim 21 comprising configuring at least one of a size, density, arrangement, and distance from the display of the light ports.

24. The method of claim 21 comprising dynamically varying the arrangement of the light ports.

25. The method of claim 24 wherein dynamically varying the arrangement of holes includes moving a first barrier component relative to a second barrier component, each barrier component having a pseudo-random arrangement of light ports through which the images are viewable moveable relative to the display.

26. The method of claim 21 comprising optimizing the arrangement of light ports for a predetermined viewpoint.

27. The method of claim 21 comprising optimizing the arrangement of light ports for multiple predetermined viewpoints.

28. The method of claim 21 wherein rendering images includes rendering images for different viewpoints located in arbitrary locations.

29. The method of claim 21 wherein rendering images includes blending pixels viewable by two or more viewpoints.

30. The method of claim 21 wherein rendering images includes turning off pixels viewable by two or more viewpoints.

31. The method of claim 21 comprising calibrating the display and the renderer using a binary coding scheme to uniquely identify the visibility of each pixel.

32. The method of claim 31 wherein the binary coding scheme includes a Gray code.

33. The method of claim 21 comprising tracking the movement of viewers located at the different viewpoints.

34. The method of claim 21 comprising moving the barrier relative to the display.

35. The method of claim 21 comprising generating a mask for each of the plural viewpoints.

36. The method of claim 35 wherein generating the mask includes generating the mask for each of the plural viewpoints for each frame of the displayed image.

37. A computer-readable medium comprising computer executable instructions embodied in a tangible, non-transitory computer-readable medium and when executed by a processor of a computer performs steps comprising:
   rendering, by a renderer, images from the plural different viewpoints; and
   simultaneously displaying the images on a display located behind a parallax barrier having a pseudo-random light port distribution such that pixels that should appear differently from the different viewpoints are displayed in a predetermined manner and wherein the arrangement of light ports in the barrier smoothes interference between different viewpoints as perceived by viewers located at the different viewpoints, wherein the light ports are arranged in a non-uniformly distributed pattern, and wherein the non-uniformly distributed pattern comprises a pseudo-random pattern with a minimum distance constraint that defines a minimum distance that each of the light ports must be separated from every other light port and with desired average number of light ports per unit area, wherein the renderer, the barrier, and the display comprise an autostereo display system that displays images on the display, which is located on a first side of the barrier, to users located on a second side of the barrier opposite the first side.

38. An autostereoscopic display comprising:
a display for displaying images from different viewpoints; and
a parallax barrier located in front of the display, the barrier having a non-uniform arrangement of light ports through which the images are viewable, wherein the light ports are arranged in a non-uniformly distributed pattern, and wherein the non-uniformly distributed pattern comprises a pseudo-random pattern with a minimum distance constraint that defines a minimum distance that each of the light ports must be separated from every other light port and with desired average number of light ports per unit area;
wherein the display is configurable to receive a composite image of images from plural viewpoints such that pixels that should appear differently from different viewpoints are displayable in a predetermined manner and wherein the arrangement of light ports in the barrier smoothes interference among the images viewable among different viewpoints, wherein the display and the barrier comprise an autostereo display system that displays images on the display, which is located on a first side of the barrier, to users located on a second side of the barrier opposite the first side.

* * * * *